United States Patent Office 3,359,304
Patented Dec. 19, 1967

3,359,304
BORON-CONTAINING COMPOUNDS AND METHOD FOR MAKING THE SAME
Jack Bobinski, Rockaway, and Daniel Grafstein and Joseph Green, Dover, and Nathan Mayes, Rockaway, N.J., assignors to Thiokol Chemical Corporation, Bristol, Pa., a corporation of Delaware
No Drawing. Filed Oct. 2, 1959, Ser. No. 844,818
12 Claims. (Cl. 260—485)

This invention relates to combustible organoboron compounds and to methods for making them, and relates particularly to decaborane derivatives of alkynyl dicarboxylic acids, to polymers prepared therefrom, and to methods of preparing these monomeric and polymeric substances.

Liquid products of this invention may be used as high-energy fuels alone or mixed with other combustible liquids such as compatible hydrocarbon fuels. Solid products of this invention, when mixed with suitable oxidizers such as ammonium, potassium, or sodium perchlorate, ammonium nitrate, etc., yield solid propellants suitable for rocket power plants and other jet propelled devices.

Such propellant mixtures are compounded by a number of techniques known to the art. For example, the mixtures may comprise from 5 to 35 parts by weight of boron containing materials and from 65 to 95 parts by weight of a solid oxidizing agent intimately mixed therewith. In some cases, the propellant may also be made with a curable polymer, for example, of the polyurethane, polyester, or polyether types. The cured polymer serves as a binder for mechanical strength and may improve burning characteristics.

Combustible boron compounds, because of their exceptionally high heats of combustion, are useful components of either liquid or solid fuel mixtures.

The organoboron compounds herein described are formed by addition of decaborane, $B_{10}H_{14}$, to the acetylenic bond of an alkynyl dicarboxylic acid, and by condensation polymerization of these diacid derivatives with polyhydric materials. The condensation of diacid and polyhydric compound preferably proceeds using a diester of the acid.

The novel decaborane diacid derivatives of the invention, described below as diesters, are believed to have the following formula:

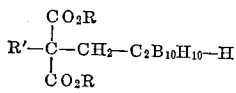

wherein $—C_2B_{10}H_{10}—$ is the carboranyl group, R' is hydrogen, methyl, or $—CH_2—C_2B_{10}H_{10}—H$, and R is an alkyl group having one to six carbon atoms.

Such esters are produced by first reacting a sodiomalonic ester with an acetylenic halide in an anhydrous alcohol, e.g. ethanol, in a typical malonic ester synthesis, under conditions known to the art for such syntheses. Decaborane is then added to the acetylenic bond of the product using a nitrogen coordinated decaborane compound. The resulting boron-containing diester may be condensed with a polyhydric alcohol to give a polyester.

As exemplary of the invention, the following preferred synthesis can be given:

(a) Formation of bis(acetonitrilo) decaborane $$2CH_3CN + B_{10}H_{14} \rightarrow (CH_3CN)_2B_{10}H_{12} + H_2$$

(b) Malonic ester synthesis with propargyl bromide

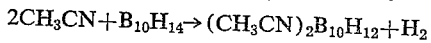
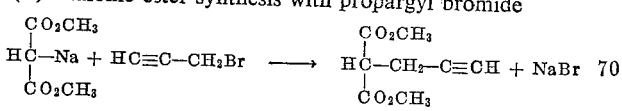

(c) Formation of decaborane derivative

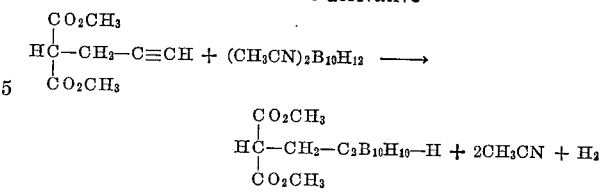

(d) Condensation with, e.g., ethylene glycol

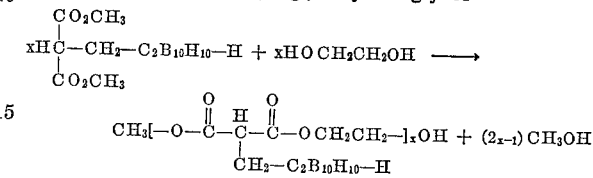

For polymers made according to this invention, $x$ advantageously has an integral value such that the product has a molecular weight up to 20,000, more advantageously between 500 and 20,000, or between 500 and 4000 or 5000.

In a similar fashion, decaborane derivatives of 2-methyl propanedicarboxylic acid-1,3 can be prepared as monomers and as polyester polymers. Also, both hydrogen atoms of the malonic ester may be replaced in the malonic ester synthesis to yield products such as

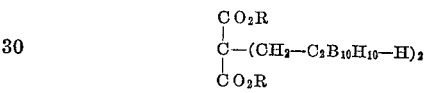

wherein R has its earlier significance.

Further, the steps of the synthesis may be modified first to form a decaborane derivative of an alkynyl halide, with later reaction of the organoboron halide in the malonic ester synthesis.

Decaborane, a solid at ordinary temperatures, is generally formed by heating the lower boron hydrides, e.g. by heating diborane to 115–120° C. for 48 hours, or by heating $B_4H_{10}$ to 90–95° C. for 5 hours.

The addition of decaborane to the acetylenic linkage is accomplished by means of a nitrogenous derivative of decaborane. The latter reacts with ammonia, primary and secondary amines and diamines, and nitriles and dinitriles with the evolution of hydrogen. The reaction with ammonia takes place at 120° C. and is well known in the art. Similar bonding occurs with monoamines as, for example, methylamine, ethylamine, n-propylamine, isopropylamine, n-butylamine, isobutylamine, sec-butylamine, tert-butylamine, n-amylamine, isoamylamine, 2-aminopentane, inter alia. As secondary amines dimethylamine, diethylamine, di-n-propylamine, diisopropylamine, di-n-butylamine, diisobutylamine, and di-sec-butylamine may be given as examples. Diamines include, for example, ethylenediamine, propylenediamine, tri-methylenediamine, 1,3 - diaminobutane, 1,4 - butanediamine, 1,5 - pentanediamine, hexamethylenediamine, and octamethylenediamine. As nitriles and dinitriles, acetonitrile, propionitrile, cyanogen, malononitrile, succinonitrile, glutaronitrile, adiponitrile and B,B'-oxydipropiontrile can be mentioned as examples.

The boron-nitrogen compounds are apparently formed by electron sharing between decaborane and the nitrogen atoms of the compounds described above, with elimination of hydrogen. The compounds are therefore nitrogen derivatives of $B_{10}H_{14}$ and are herein defined as "nitrogen coordinated decaborane derivatives."

As a preferred example of these derivatives, the coordination compound of decaborane and acetonitrile may be mentioned. Acetonitrile, on refluxing with decaborane, forms a product which appears to be $(CH_3CN)_2B_{10}H_{12}$, with hydrogen being evolved as a byproduct. The bis(acetonitrilo) decaborane compound is particularly convenient because of the unexpected ease with which acetonitrile is displaced almost quantitatively in the coupling of the decaborane group to an acetylenic bond.

The reaction between the acetylenic bond and a nitrogen coordinated decarborane compound proceeds conveniently by refluxing the reactants in a hydrocarbon solvent such as benzene, xylene, or toluene.

For forming polyester polymers of the novel diacids described above, numerous polyhydric alcohols can be used, including those useful for conventional alkyd polymer condensation. These materials include saturated and unsaturated diols having one to ten carbon atoms, including branched chain diols, and have the general formula R″(OH)$_2$, wherein R″ is an aliphatic hydrocarbon radical having up to 10 carbon atoms. Representative of this group are: ethylene glycol; pentanediol-1,2; butanediol-1,4; 2-methyl propanediol-1,3; hexanediol-1,6; 2-butynediol-1,4; 2-butenediol-1,4; 2-methyl, 2-butenediol-1,4; 1,8-octanediol; 1,9-nonanediol; and decanediol-1,10.

The condensation polymerization is preferably carried out in the presence of a suitable alcoholysis catalyst as, for example, sodium methoxide and magnesium, butyl titanate, 2-ethylhexyl titanate, zinc chloride, zinc borate with lead monoxide, or p-toluenesulfonic acid.

The polymerization is carried out by techniques known for condensation polymerization, conveniently by heating the mixed reactants between 100° and 300° centigrade for periods up to 50 hours or longer, depending on the molecular weight of the product desired.

From the earlier disclosures concerning the structure of the diacid and glycol reactants, it will be evident that the polyester polymers formed will be of the formula:

$$A(O-\overset{O}{\overset{\|}{C}}-\overset{R'}{\overset{|}{C}}-\overset{O}{\overset{\|}{C}}-OR''O)_x-B$$
$$\overset{|}{CH_2-C_2B_{10}H_{10}-H}$$

wherein A is a terminal group which may be R— or HOR″—, B is a terminal group which may be —H or $$-\overset{O}{\overset{\|}{C}}-\overset{R'}{\overset{|}{C}}-\overset{O}{\overset{\|}{C}}-OR$$
$$\overset{|}{CH_2-C_2B_{10}H_{10}-H}$$

R, R′, and R″ have their earlier meanings (i.e. R′ is hydrogen, methyl, or —CH$_2$—C$_2$B$_{10}$H$_{10}$, R is an alkyl group having one to six carbon atoms, and R″ is an aliphatic hydrocarbon radical having up to 10 carbon atoms), and x has a value such that the polymer has a molecular weight up to 20,000.

The following specific examples illustrate the preparation of representative compounds of the type herein described.

*Example 1*

The diethyl ester of (carboranylmethyl) malonic acid

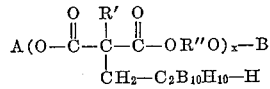

was prepared as follows.

Bis(acetonitrilo) decarborane was prepared by refluxing 20 moles of acetonitrile and two moles of decaborane for 10 minutes. After cooling, white crystals of bis(acetonitrilo) decarborane were filtered from the system.

400 grams (2.5 moles) of diethyl malonate, 59 grams (2.5 moles) of metallic sodium, and 298 grams (2.5 moles) of propargyl bromide were stirred together in 1400 ml. of anhydrous ethyl alcohol for 24 hours at room temperature. The solution was filtered and the alcohol removed by heating. The remaining liquid was distilled under reduced pressure to yield 215 grams of the diethyl ester of 2-propargyl propanedioic acid (i.e. diethyl propargyl malonate) and 41 grams of the diethyl ester of 2,2-dipropargyl propanedioic acid (i.e. diethyl dipropargyl malonate) as a second fraction. The diethyl propargyl malonate is a liquid having a boiling point of 119–122° C./14 mm. Hg, and an index of refraction $n_D^{25}$ of 1.4368. Diethyl dipropargyl malonate is a crystalline substance having a melting point of 45–46° C. and a boiling point of 113° C./2 mm. Hg.

119.5 grams (0.59 mole) of bis(acetonitrilo) decaborane were mixed with a solution of 117.0 grams (0.59 mole) of diethyl-propargyl malonate dissolved in 1500 ml. of benzene. The mixture was heated at reflux for 10 hours and filtered after cooling. The benzene of the filtrate was removed by evaporation. The residue remaining after evaporation was extracted with n-pentane. The extracted solution was treated with 30 ml. of absolute ethanol by refluxing the two liquids together for a few minutes to destroy reactive impurities. The solution was distilled first to remove the n-pentane, second the alcohol, and finally to obtain 99.4 grams of the diethyl ester of (carboranylmethyl) malonic acid (52–53 percent of theoretical yield). The compound was a liquid with a boiling point of 148–150° C./0.2 mm. Hg and an index of refraction $n_D^{25}$ of 1.5072. Analysis showed:

Calculated for C$_{10}$H$_{24}$B$_{10}$O$_4$: C, 37.95%; H, 7.64%; B, 34.19%. Found: C, 38.99%; H, 7.95%; B, 34.7%.

*Example 2*

The diethyl ester of (carboranylmethyl) methyl-malonic acid

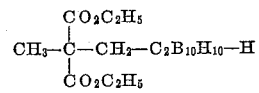

was prepared as follows.

The process of Example 1 was followed except for replacing the 0.59 mole of diethyl propargyl malonate of Example 1 with 0.59 mole of the diethyl ester of 2-methyl, 2-propargyl propanedioic acid (i.e. diethyl methyl propargyl malonate).

The latter was prepared by stirring together 522.6 grams (3.0 moles) of the diethyl ester of 2-methyl propanedioic acid (i.e. diethyl methyl malonate), 69 grams (3.0 moles) of sodium, and 256.9 grams (3.0 moles) of propargyl bromide in 1500 ml. of anhydrous ethyl alcohol at room temperature for 24 hours. After filtration and removal of the alcohol from the mixture, vacuum distillation gave 301.5 grams (50 percent of theoretical yield) of diethyl methyl propargyl malonate, a colorless liquid boiling at 111–114° C./12 mm. Hg.

The boron-containing product of this example was obtained in 51 percent of theoretical yield as a white solid having a melting point of 35.5–36.5° C., a boiling point of 164° C./0.5 mm. Hg, and a refractive index $n_D^{25}$ of 1.5131. Analysis showed:

Calculated for C$_{11}$H$_{26}$O$_4$B$_{10}$: C, 39.97%; H, 7.93%; B, 32.74%. Found: C, 40.68%; H, 7.31%; B, 32.93%.

*Example 3*

The diethyl ester of bis(carboranylmethyl) malonic acid

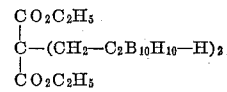

was prepared as follows.

25 grams (0.125 mole) of bis(acetonitrilo) decaborane was mixed with a solution of 11.8 grams (0.05 mole) of diethyl dipropargyl malonate (obtained in Example 1) in 250 ml. of xylene. The mixture was heated at reflux for 1 hour. Thereafter the xylene was distilled off. The residue was washed with n-pentane. Crystallization of the crude product from absolute ethanol gave a white solid having a melting point of 198–199° C. The yield of diethyl bis(carboranylmethyl) malonate was 35 percent of the theoretical. Analysis of the product showed:

Calculated for $C_{13}H_{40}O_4B_{20}$: C, 33.75%; H, 7.73%; B, 46.09%. Found: C, 33.09%; H, 8.05%; B, 46.09%.

Subsequent runs gave 46 percent yield of the product.

Example 4

An ester polymer of ethylene glycol and (carboranylmethyl) malonic acid was prepared as follows.

3.9 grams (0.013 mole) of the diethyl ester of (carboranylmethyl) methylmalonic acid, 2.4 grams (0.039 mole) of ethylene glycol, 0.006 gram of $CaH_2$, and 0.006 gram of PbO were heated together under argon for 22 hours at a temperature of 140–165° C. Thereafter volatile materials were removed by heating at 240° C./1 mm. Hg for 1.5 hours. The residue was dissolved in benzene and filtered. Evaporation of the benzene from the filtrate left a brownish-green solid, which had a cryoscopically determined molecular weight of 618.

Example 5

The polyester condensation polymer of 1,4-butanediol with the same acid mentioned above in Example 4 was prepared as follows.

6.36 grams (0.02 mole) of the diethyl ester of (carboranylmethyl) malonic acid, 5.04 grams (0.06 mole) of 1,4-butanediol, and 0.05 gram of p-toluene sulfonic acid were heated together in a 3-necked, round-bottom, glass flask with water cooled condensers attached to 2 of the three necks. A nitrogen supply was connected to the third to provide agitation of the reactant mixture. The nitrogen-agitated mixture was heated at temperatures ranging from 90–140° C. for 2 hours, during which time 3.8 ml. of ethanol were removed. Thereafter the mixture was heated for 5 hours at 150° C./15 mm. Hg and then for 16 hours at 210° C./1 mm. Hg. The residue was cooled, dissolved in benzene and filtered. The evaporated filtrate yielded a dark colored, tough solid which had a cryoscopically determined molecular weight of 603.

Example 6

The polyester condensation polymer of 1,3-propanediol and the acid mentioned in Examples 4 and 5 above was prepared as follows.

With the apparatus of Example 5, 5.0 grams (0.0157 mole) of the diethyl ester of the decaborane substituted acid mentioned in Examples 4 and 5, 3.58 grams (0.0471 mole) of 1,3-propanediol and a mixed catalyst of 0.3 gram of lead monoxide and 0.03 gram of p-toluene sulfonic acid were heated at from 95° to 130° C./5 mm. Hg for 3.5 hours, during which time ethanol was evolved and collected. The mixture was thereafter heated for 4.5 hours at 160° C./5 mm. Hg. The resulting polymer had a molecular weight of 707.

Example 7

The polyester condensation polymers of (carboranylmethyl) methylmalonic acid with 1,6-hexanediol, 1,9-nonanediol and 1,10-decanediol were separately prepared as follows.

With the apparatus as described in Example 5, 6.64 grams (0.020 mole) of the diethyl ester of the boron-containing acid mentioned above, 2.36 grams (0.020 mole) of 1,6-hexanediol and four drops of butyl titanate were heated for 44 hours at 135–140° C. as dry nitrogen was bubbled through the mixture. The mixture was heated further at 160° C. under a reduced pressure of 1 mm. of Hg for 24 hours. Heating continued for 6.5 hours at 160° C. at a reduced pressure of 10 mm. of Hg, while agitating with a stream of dry nitrogen. The resulting polymer was a light-amber colored solid having an average molecular weight of 2090.

The 1,6-hexanediol was replaced with 0.20 mole of 1,9-nonanediol and 0.20 mole of 1,10-decanediol, respectively, in two additional runs, under conditions otherwise identical with those above, to produce the respective condensation polymers, which had average molecular weights of 1710 and 1611 respectively.

Although specific embodiments have been herein shown and described, it is to be understood that they are illustrative only and are not to be construed as limiting the scope and spirit of the invention.

We claim:

1. A process for making organoborane diesters, which process comprises condensing, in the presence of metallic sodium, a propargyl halide with a diester of the formula

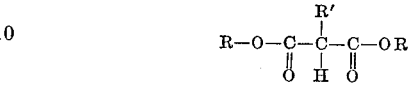

where R is a lower alkyl radical and R' is a member of the class consisting of hydrogen and methyl, whereby a propargyl radical having an acetylenic bond is substituted into said diester according to a malonic ester synthesis, and then adding decaborane to the acetylenic bond of said substituted propargyl radical by reaction with a nitrogen coordinated decaborane derivative.

2. A process as claimed in claim 1 for which said nitrogen coordinated decarborane derivative is bis(acetonitrilo) decaborane.

3. A process for making organoboron polyesters, which process comprises condensing a diester of the formula

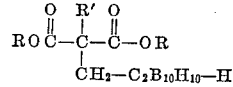

wherein —$C_2B_{10}H_{10}$— is carboranyl, R is lower alkyl, and R' is hydrogen, methyl, or —$C_2B_{10}H_{10}$—H, with a glycol in the presence of an alcoholysis catalyst.

4. A process as claimed in claim 3 for which said glycol has up to 10 carbon atoms.

5. A polyester condensation polymer of the formula

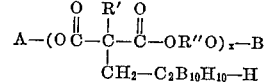

wherein A is R— or HOR"—, B is —H or

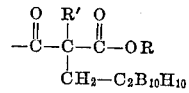

—$C_2B_{10}H_{10}$ is carboranyl, R is an alkyl group having one to six carbon atoms, R' is hydrogen, methyl, or

R" is an aliphatic hydrocarbon radical having up to 10 carbon atoms, and $x$ has a value such that the polymer has a molecular weight up to 20,000.

6. An organoboron compound of the formula

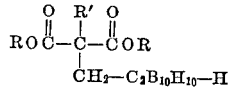

wherein —$C_2B_{10}H_{10}$— is the carboranyl group, R is hydrogen or lower alkyl, and R' is hydrogen, methyl, or —$CH_2$—$C_2B_{10}H_{10}$—H.

7. (Carboranylmethyl) malonic acid.

8. Lower alkyl esters of (carboranylmethyl) malonic acid.

9. (Carboranylmethyl) methyl malonic acid.

10. Lower alkyl esters of (carboranylmethyl) methyl malonic acid.

11. Bis(carboranylmethyl) malonic acid.

12. Lower alkyl esters of bis(carboranylmethyl) malonic acid.

No references cited.

LORRAINE A. WEINBERGER, *Primary Examiner.*

L. D. ROSDOL, *Examiner.*

L. A. SEBASTIAN, T. L. GALLOWAY,
*Assistant Examiners.*